United States Patent [19]

Hayashi

[11] 4,266,860
[45] May 12, 1981

[54] WIDE ANGLE ZOOM LENS SYSTEM HAVING SHORTENED CLOSEUP FOCAL LENGTH

[75] Inventor: Kiyoshi Hayashi, Yokohama, Japan

[73] Assignee: Nippon Kogaku K.K., Tokyo, Japan

[21] Appl. No.: 71,055

[22] Filed: Aug. 30, 1979

[30] Foreign Application Priority Data

Sep. 8, 1978 [JP] Japan .................. 53-109772

[51] Int. Cl.³ .................................... G02B 15/16
[52] U.S. Cl. .................................... 350/426
[58] Field of Search ........................... 350/184, 186

[56] References Cited
U.S. PATENT DOCUMENTS

| | | | |
|---|---|---|---|
| 3,992,084 | 11/1976 | Nakamura | 350/186 |
| 4,099,846 | 7/1978 | Kawamura et al. | 350/186 |
| 4,155,629 | 5/1979 | Nakamura | 350/184 |
| 4,169,660 | 10/1979 | Nakamura | 350/176 |
| 4,189,212 | 2/1980 | Mizutani | 350/184 |
| 4,190,323 | 2/1980 | Ogawa | 350/184 |

*Primary Examiner*—Conrad J. Clark
*Attorney, Agent, or Firm*—Shapiro and Shapiro

[57] ABSTRACT

A wide angle zoom lens system capable of photographing objects from infinity to a close distance while maintaining an excellent image-forming performance employs a first group which is a divergent lens group having a focusing function, and a second group which is a convergent lens group disposed rearwardly of the first group. The first group includes a divergent forward portion and a convergent rearward portion disposed with a predetermined spacing from the forward portion, the forward and rearward portions being movable relative to one another for focusing. The first and second groups are movable relative to each other to effect a magnification change.

9 Claims, 14 Drawing Figures

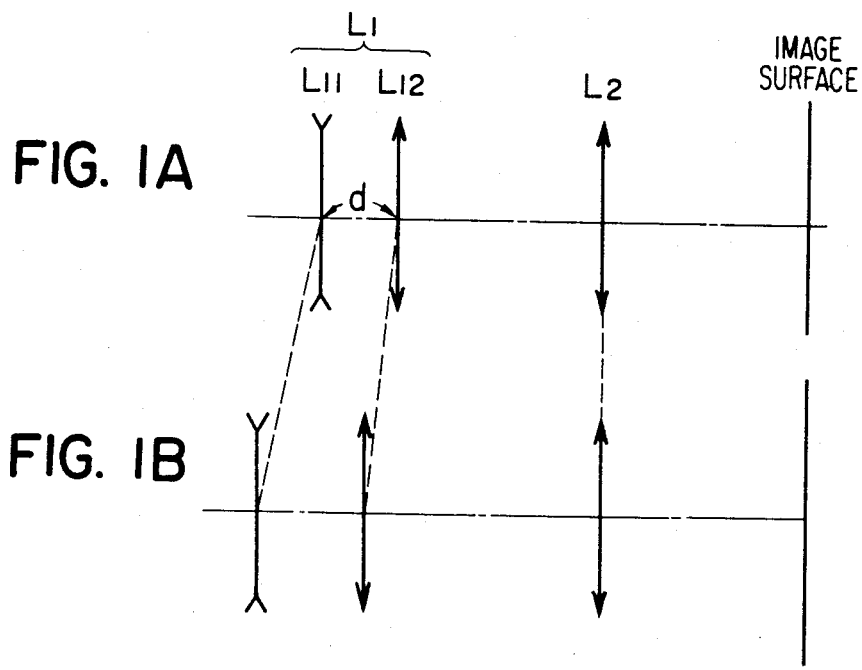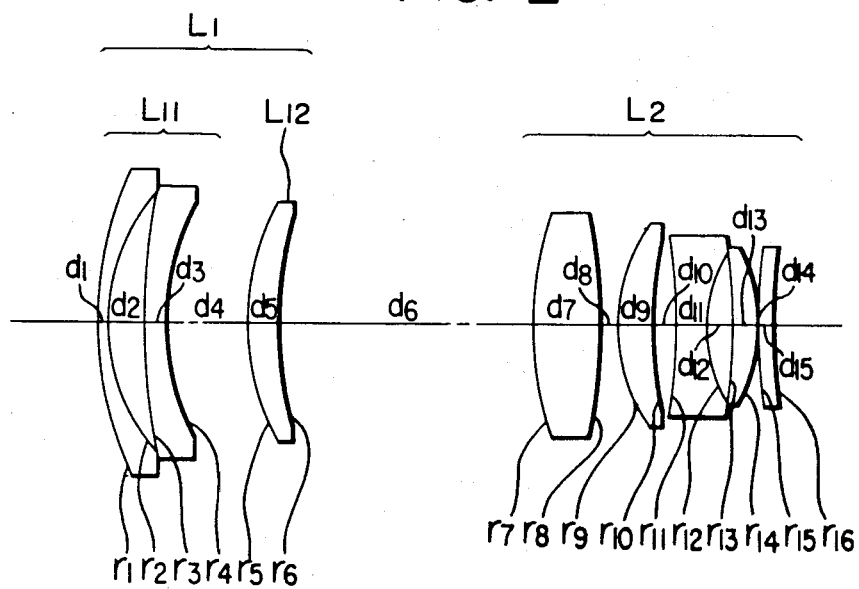

WIDE ANGLE ZOOM LENS SYSTEM HAVING SHORTENED CLOSEUP FOCAL LENGTH

BACKGROUND OF THE INVENTION

1. Field of the Invention

This invention relates to the shortening of the closeup focal length of a zoom lens system, particularly, a wide angle zoom lens system.

2. Description of the Prior Art

A zoom lens system covering a wide angle of view, the so-called two-group wide angle zoom lens which comprises two groups, i.e., a first group which is a divergent lens group and a second group which is a convergent lens group, has recently been developed. Various problems which have been unavoidable in conventional wide angle zoom lenses, such as variations in spherical aberration, coma and astigmatism resulting from zooming, particularly, significant negative distortion on the short focal length side, have been solved. Recent years have seen the advent of wide angle zoom lenses having high performance. However, if the diameter of the forward lens is reduced, or if the entire lens system is arranged in a compact form, the aforementioned variations in aberrations cannot always be corrected satisfactorily. Particularly on the long focal length side, spherical aberration becomes considerably over-corrected and if the first group is moved forwardly to effect focusing upon an object which is close, the tendency toward over-correction becomes more pronounced, and results in extreme over-correction of spherical aberration. Therefore, in a wide angle zoom lens system comprising a divergent group and a convergent group, it has been difficult to enhance the image-forming performance of close range objects, and it has been unavoidably necessary to confine the closeup focal length to a relatively long distance.

SUMMARY OF THE INVENTION

It is an object of the invention to provide a wide angle zoom lens system which comprises two groups, i.e., a divergent group and a convergent group, and in which the closeup focal length is shortened, and which has an improved close distance performance.

Briefly stated, a wide angle zoom lens system in accordance with the invention, which is capable of photographing objects from infinity to a close distance while maintaining an excellent image-forming performance, employs a first group which is a divergent lens group having a focusing function, and a second group which is a convergent lens group disposed rearwardly of the first group. The first group includes a divergent forward portion, and a convergent rearward portion disposed with a predetermined spacing from the forward portion, the forward and rearward portions being movable relative to one another for focusing. The first and second groups are movable relative to each other to effect a magnification change. During the focusing upon an object at close range both the forward portion and the rearward portion are moved toward the object side, but the amounts of movement of the forward and rearward portions are different, that is, the air space between these portions is increased.

The invention will become more fully apparent from the following detailed description thereof taken in conjunction with the accompanying drawings.

BRIEF DESCRIPTION OF THE DRAWINGS

FIGS. 1(a) and (b) show the basic construction of the present invention as a Gauss system, FIG. 1(a) showing the focusing condition with respect to an infinite object and FIG. 1(b) showing the focusing condition with respect to an object at a close distance;

FIG. 2 shows the lens arrangement of a first embodiment;

FIGS. 8(a) and 8(b), 9(a) and 9(b), and 10(a) and 10(b) illustrate spherical aberration in a case where the close distance correction at an object distance of 1 m is effected on the longest focal length side of the first, second and third embodiments, respectively, (a), and in a case where such correction is not effected (b).

DESCRIPTION OF THE PREFERRED EMBODIMENTS

Figure 3:
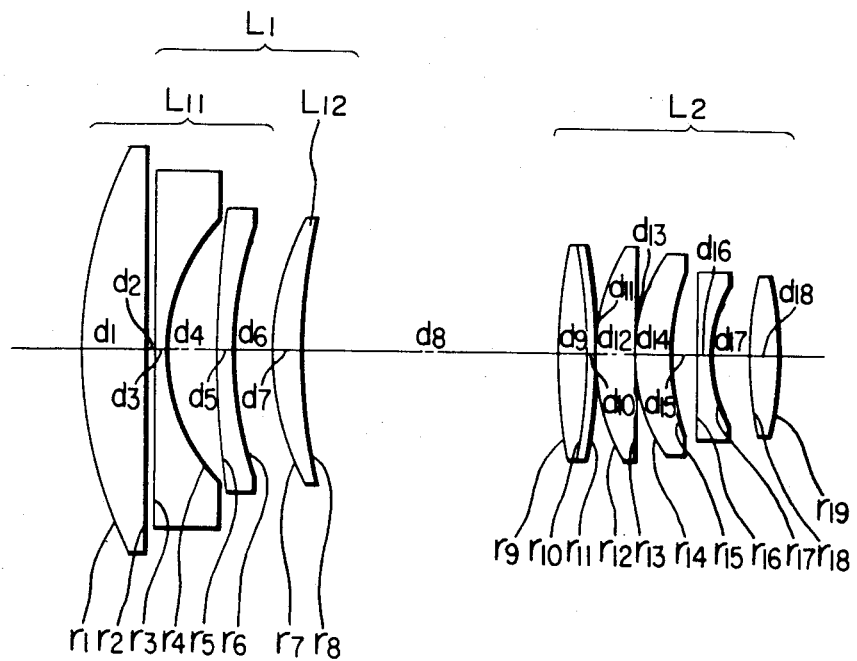
FIG. 3 shows the lens arrangement of a second embodiment.

The basic construction of the present invention is shown in FIGS. 1(a) and 1(b). FIG. 1(a) shows the focusing condition with respect to an object at infinity, and FIG. 1(b) shows the focusing condition with respect to an object at close range. Assume that when a light ray parallel to the optical axis is incident on a first lens group $L_1$, the incidence height in the forward portion $L_{11}$ thereof is $h_{11}$ and the incidence height in the rearward portion $L_{12}$ thereof is $h_{12}$. If the incidence height of this light ray in the rearward portion $L'_{12}$ is $h'_{12}$ when the air space between the forward portion $L_{11}$ and the rearward portion $L_{12}$ is increased, $h'_{12} > h_{12}$ because the forward portion $L_{11}$ is a divergent lens group. The greater the value this incidence height has, the greater effect upon spherical aberration, and since the rearward portion $L_{12}$ is a convergent lens group, the greater the value of the incidence height, and the more the correction of spherical aberration is effected in the direction of under-correction.

In this lens system, the closer the object, the more spherical aberration is over-corrected, but for the reasons set forth above, it becomes possible to correct spherical aberration well in accordance with the object distance if the air space d between the forward and rearward portions of the first group is increased. The difference in amount of movement between the forward portion and the rearward portion should be determined by the difference in residual amount of spherical aberration in that lens system.

However, since this lens system is a zoom lens system, the spherical aberration on the long focal length side which occurs in such lens system must be adjusted in order to enhance the effect of the aforementioned close distance correction system in both the closeup focal length condition and the long focal length condition. The desirable conditions for this are as follows:

$$1.2|f_1| < f_{12} < 2.8|f_1| \tag{1}$$

and $$0.07 < d/|f_1| < 0.2 \tag{2}$$

where $f_1$ is the total focal length of the first group, $f_{12}$ is the total focal length of the rearward portion of the first group, and d is the spacing between the image side principal plane of the forward portion of the first group and the object side principal plane of the rearward portion of the first group in the focusing condition with respect to an object at infinity, or an infinite focal length.

Formula (1) is concerned with the power distribution in the forward and rearward portions of the first group. The spherical aberration on the long focal length side tends to be essentially over-corrected at a close distance, and therefore, it is necessary to maintain the spherical aberration somewhat under-corrected with respect to an object at infinity. If the lower limit of formula (1) is exceeded, the spherical aberration on the long focal length side will become unduly over-corrected and this will make even the use of the aforementioned close distance correction mechanism less effective. If the upper limit of formula (1) is exceeded, the spherical aberration will become unduly under-corrected and the use of the aforementioned close distance correction mechanism will become meaningless.

Formula (2) is for suppressing the variation in spherical aberration resulting from a variation in focal length. If the lower limit of this formula is exceeded, it will become impossible to correct the variation in spherical aberration resulting from a variation in focal length. If the upper limit of this formula is exceeded, the first lens group will become too thick and the image side principal plane of the first group will shift toward the object side to reduce the air space between the first group and the second group and reduce the range of movement of the two groups, thereby undesirably reducing the zoom ratio.

Unless the lens system is one which satisfies the conditions of formulas (1) and (2), the correction effect of spherical aberration, particularly that on the long focal length side during focusing with respect to a close distance object will be reduced.

According to the present invention as has been described above, the image-forming performance for objects at a close distance has been improved and the closeup focal length has been greatly shortened to make it possible to maintain the aberrations in a well-corrected condition on the long focal length side of $f=70$ mm and for a magnification $\beta = -0.25$ or near.

Embodiments of the present invention will hereinafter be described.

In a first embodiment, the lens arrangement of which is shown in FIG. 2, the forward portion $L_{11}$ of the first group $L_1$ comprises two negative meniscus lenses each having its convex surface facing the object side, and the rearward portion $L_{12}$ comprises a positive meniscus lens having its convex surface facing the object side.

In a second embodiment, as shown in FIG. 3, the forward portion $L_{11}$ of the first group $L_1$ comprises three components, in order from the object side, i.e., a positive lens having its more sharply curved surface facing the object side, a negative lens having its more sharply curved surface facing the image side, and a negative meniscus lens having its convex surface facing the object side. The rearward portion $L_{12}$ comprises a positive meniscus lens having its convex surface facing the object side.

Figure 4:
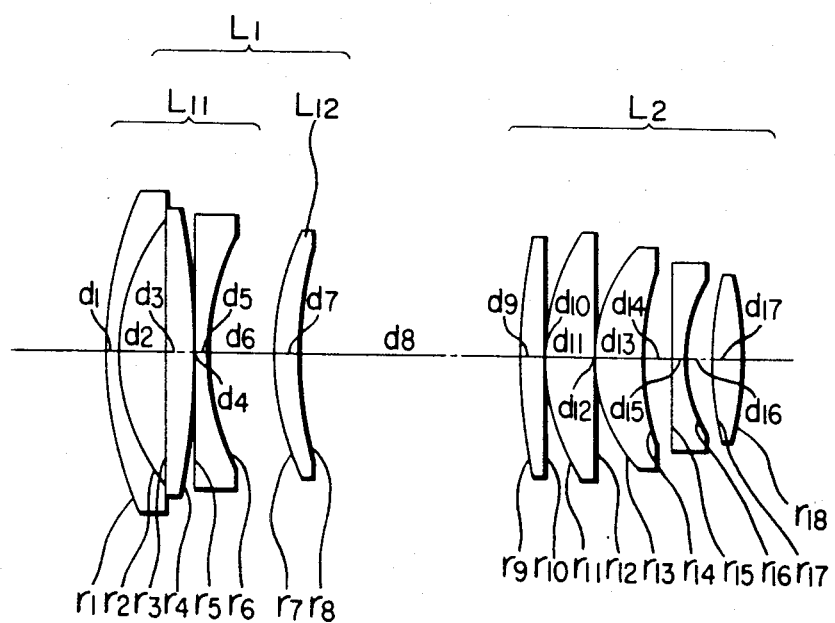
FIG. 4 shows the lens arrangement of a third embodiment.

In a third embodiment, as shown in FIG. 4, the forward portion $L_{11}$ of the first group $L_1$ comprises three components, in order from the object side, i.e., a negative meniscus lens having its convex surface facing the object side, and a positive lens and a negative lens, each having its more sharply curved surface facing the image side, and the rearward portion $L_{12}$ comprises a positive meniscus lens having its convex surface facing the object side as in the first and second embodiments. As regards the second group $L_2$, it may desirably comprise at least five components including a negative lens, as shown in the lens arrangement of each embodiment.

The numerical data of the respective embodiments are shown below. In the tables below, r, d, n and $\nu$, respectively, represent the curvature radius of each refractive surface, the center thickness of and the air space between the lenses, the refractive index for d-line, and the Abbe number for d-line. The subscripts represent the order from the object side.

FIRST EMBODIMENT
Total focal length of the entire system: $f = 36.0 \sim 68.6$
Angle of view: $2\omega = 31° \sim 17.6°$ F-number: 3.5

| | | | |
|---|---|---|---|
| $r_1 = 43.640$ | $d_1 = 1.5$ | $n_1 = 1.71300$ | $\nu_1 = 53.9$ |
| $r_2 = 25.862$ | $d_2 = 4.9$ | | |
| $r_3 = 97.646$ | $d_3 = 2.3$ | $n_2 = 1.69680$ | $\nu_2 = 55.6$ |
| $r_4 = 34.089$ | $d_4 = $ close distance correcting spacing | | |
| $r_5 = 32.807$ | $d_5 = 3.8$ | $n_3 = 1.80518$ | $\nu_3 = 25.5$ |
| $r_6 = 43.313$ | $d_6 = $ variable spacing | | |
| $r_7 = 38.800$ | $d_7 = 8.6$ | $n_4 = 1.62041$ | $\nu_4 = 60.3$ |
| $r_8 = -118.771$ | $d_8 = 2.5$ | | |
| $r_9 = 21.150$ | $d_9 = 4.9$ | $n_5 = 1.62041$ | $\nu_5 = 60.3$ |
| $r_{10} = 67.565$ | $d_{10} = 2.7$ | | |
| $r_{11} = -111.186$ | $d_{11} = 4.2$ | $n_6 = 1.80518$ | $\nu_6 = 25.5$ |
| $r_{12} = 20.265$ | $d_{12} = 3.0$ | | |
| $r_{13} = -100.634$ | $d_{13} = 3.2$ | $n_7 = 1.62588$ | $\nu_7 = 35.6$ |
| $r_{14} = -29.367$ | $d_{14} = 0.1$ | | |
| $r_{15} = 50.024$ | $d_{15} = 2.5$ | $n_8 = 1.62588$ | $\nu_8 = 35.6$ |
| $r_{16} = 110.281$ | | | |

Back focal distance: $\beta f = 42.7 \sim 65.2$
Close distance correction spacing: $d_4 = 10.7(\infty) \sim 11.3 (\beta = -0.25)$
Variable spacing: $d_6 = 32.85 \sim 0.05$

SECOND EMBODIMENT
Total focal length of the entire system: $f = 36.0 \sim 68.8$
Angle of view: $2\omega = 31° \sim 17.4°$ F-number: 3.5

| | | | |
|---|---|---|---|
| $r_1 = 61.849$ | $d_1 = 8.2$ | $n_1 = 1.60323$ | $\nu_1 = 42.5$ |
| $r_2 = -1037.164$ | $d_2 = 0.7$ | | |
| $r_3 = 1000.000$ | $d_3 = 1.5$ | $n_2 = 1.67790$ | $\nu_2 = 55.5$ |
| $r_4 = 23.900$ | $d_4 = 6.8$ | | |
| $r_5 = 178.734$ | $d_5 = 1.5$ | $n_3 = 1.71300$ | $\nu_3 = 53.9$ |
| $r_6 = 42.672$ | $d_6 = $ close distance correcting spacing | | |
| $r_7 = 34.110$ | $d_7 = 3.9$ | $n_4 = 1.59507$ | $\nu_4 = 35.6$ |
| $r_8 = 81.925$ | $d_8 = $ variable spacing | | |
| $r_9 = 72.840$ | $d_9 = 3.5$ | $n_5 = 1.62041$ | $\nu_5 = 60.3$ |
| $r_{10} = -72.840$ | $d_{10} = 1.0$ | $n_6 = 1.80518$ | $\nu_6 = 25.5$ |
| $r_{11} = -144.173$ | $d_{11} = 0.1$ | | |
| $r_{12} = 26.644$ | $d_{12} = 4.9$ | $n_7 = 1.51118$ | $\nu_7 = 50.9$ |
| $r_{13} = 246.000$ | $d_{13} = 0.1$ | | |
| $r_{14} = 20.743$ | $d_{14} = 4.5$ | $n_8 = 1.51680$ | $\nu_8 = 64.2$ |
| $r_{15} = 27.990$ | $d_{15} = 3.9$ | | |
| $r_{16} = -370.855$ | $d_{16} = 1.5$ | $n_9 = 1.80518$ | $\nu_9 = 25.5$ |
| $r_{17} = 18.700$ | $d_{17} = 5.2$ | | |
| $r_{18} = 64.660$ | $d_{18} = 3.8$ | $n_{10} = 1.64831$ | $\nu_{10} = 33.8$ |
| $r_{19} = -39.168$ | | | |

Back focal distance: $\beta f = 43.7 \sim 66.3$
Close distance correction spacing: $d_6 = 5.7(\infty) \sim 6.2(\beta = -0.25)$
Variable spacing: $d_8 = 33.45 \sim 0.65$

THIRD EMBODIMENT
Total focal length of the entire system: $f = 36.0 \sim 68.8$
Angle of view: $2\omega = 31° \sim 17.4°$ F-number: 3.5

| | | | |
|---|---|---|---|
| $r_1 = 50.379$ | $d_1 = 1.3$ | $n_1 = 1.74443$ | $\nu_1 = 49.4$ |

-continued

THIRD EMBODIMENT

Total focal length of the entire system: $f = 36.0 \sim 68.8$
Angle of view: $2\omega = 31° \sim 17.4°$ F-number: 3.5

| | | | |
|---|---|---|---|
| $r_2 = 27.469$ | $d_2 = 6.3$ | | |
| $r_3 = 670.373$ | $d_3 = 3.5$ | $n_2 = 1.51680$ | $\nu_2 = 64.2$ |
| $r_4 = -114.009$ | $d_4 = 0.1$ | | |
| $r_5 = \infty$ | $d_5 = 1.8$ | $n_3 = 1.71300$ | $\nu_3 = 53.9$ |
| $r_6 = 32.531$ | $d_6 =$ distance correcting spacing | | |
| $r_7 = 35.195$ | $d_7 = 3.4$ | $n_4 = 1.76182$ | $\nu_4 = 26.5$ |
| $r_8 = 57.902$ | $d_8 =$ variable spacing | | |
| $r_9 = 101.102$ | $d_9 = 3.0$ | $n_5 = 1.51680$ | $\nu_5 = 64.2$ |
| $r_{10} = -763.611$ | $d_{10} = 0.1$ | | |
| $r_{11} = 28.387$ | $d_{11} = 6.4$ | $n_6 = 1.52000$ | $\nu_6 = 70.1$ |
| $r_{12} = -449.780$ | $d_{12} = 0.1$ | | |
| $r_{13} = 19.335$ | $d_{13} = 5.9$ | $n_7 = 1.52000$ | $\nu_7 = 70.1$ |
| $r_{14} = 37.463$ | $d_{14} = 4.0$ | | |
| $r_{15} = -564.061$ | $d_{15} = 1.4$ | $n_8 = 1.80518$ | $\nu_8 = 25.5$ |
| $r_{16} = 16.279$ | $d_{16} = 3.85$ | | |
| $r_{17} = 44.719$ | $d_{17} = 4.1$ | $n_9 = 1.67270$ | $\nu_9 = 32.2$ |
| $r_{18} = -56.453$ | | | |

Back focal distance: $\beta f = 43.8 \sim 68.7$
Close distance correction spacing: $d_6 = 8.4(\infty) \sim 9.0(\beta = -0.25)$
Variable spacing: $d_8 = 28.93 \sim 0.77$ Various values forming the basic construction of each embodiment will be shown below.

| | First Embodiment | Second Embodiment | Third Embodiment |
|---|---|---|---|
| $f_1$ | −59.966 | −59.942 | −53.000 |
| $f_{12}$ | 144.643 | 95.312 | 110.660 |
| $f_{12}/|f_1|$ | 2.412 | 1.590 | 2.090 |
| $d$ | 6.79 | 5.69 | 8.82 |
| $d/|f_1|$ | 0.11 | 0.09 | 0.16 |

Figure 5:
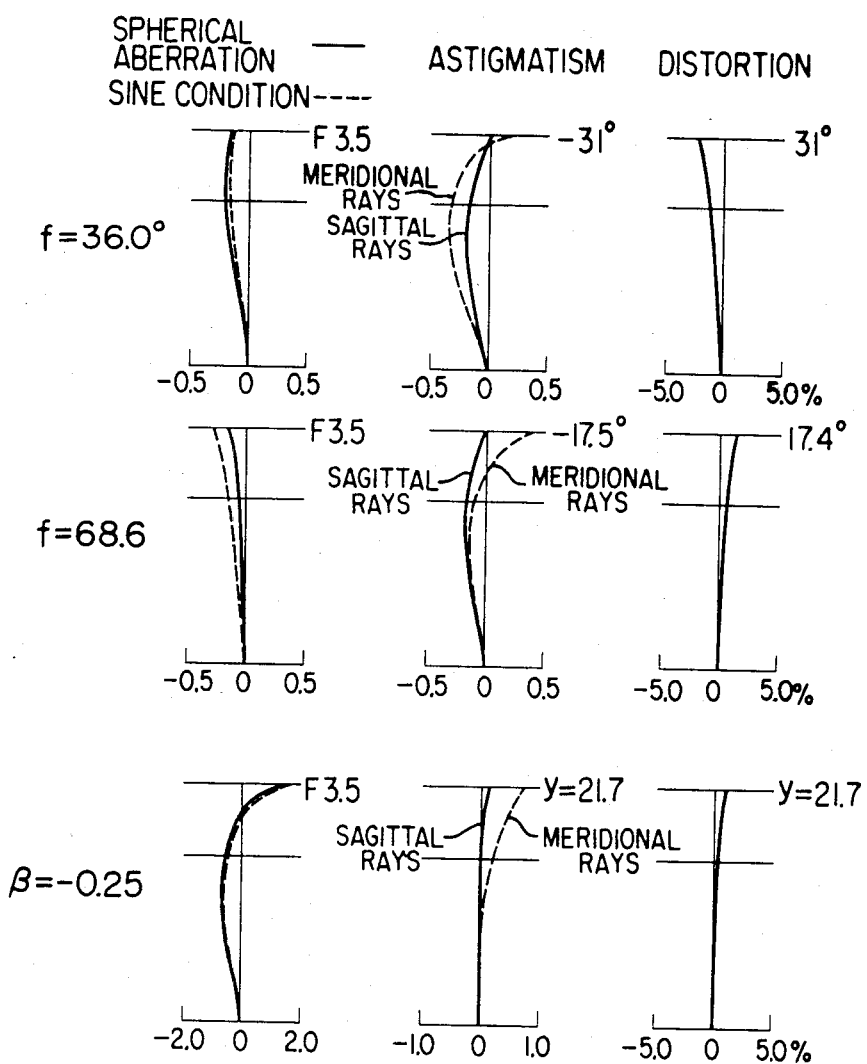
FIGS. 5, 6 and 7 illustrate aberrations with a photographing magnification $\beta = -0.25$ on the closeup focal length side and the longest focal length side of the respective embodiments.
Figure 6:
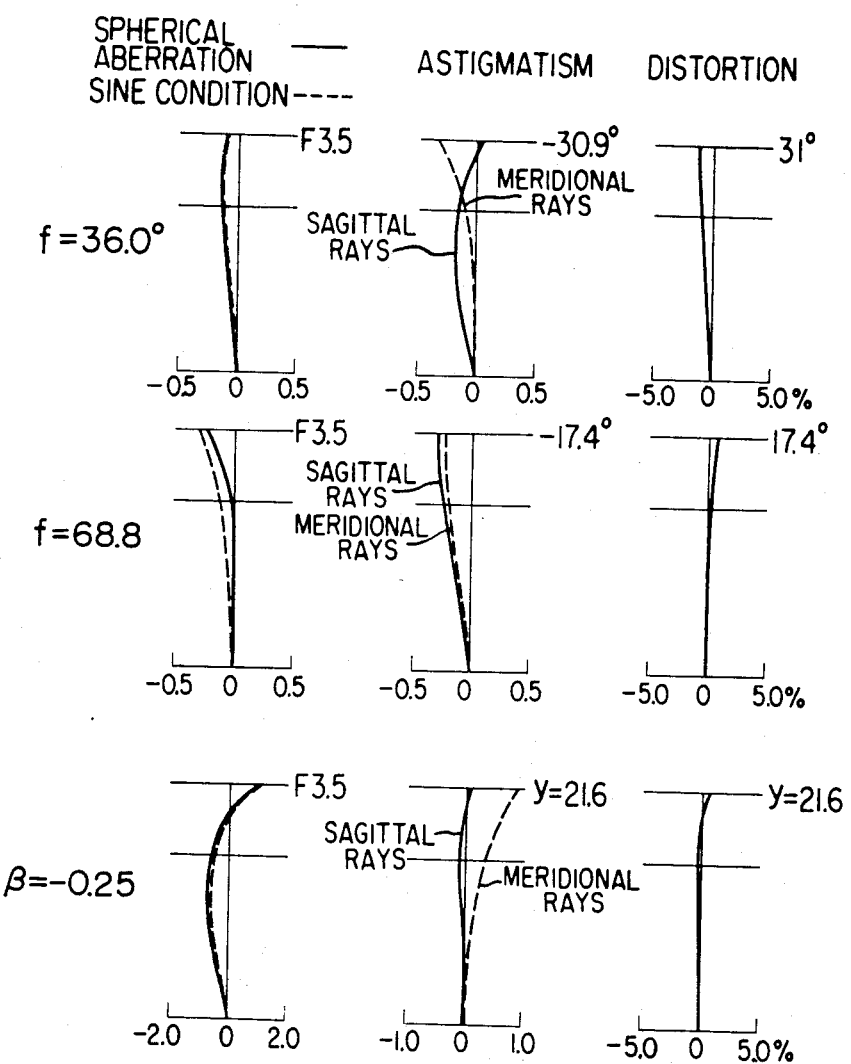
Figure 7:
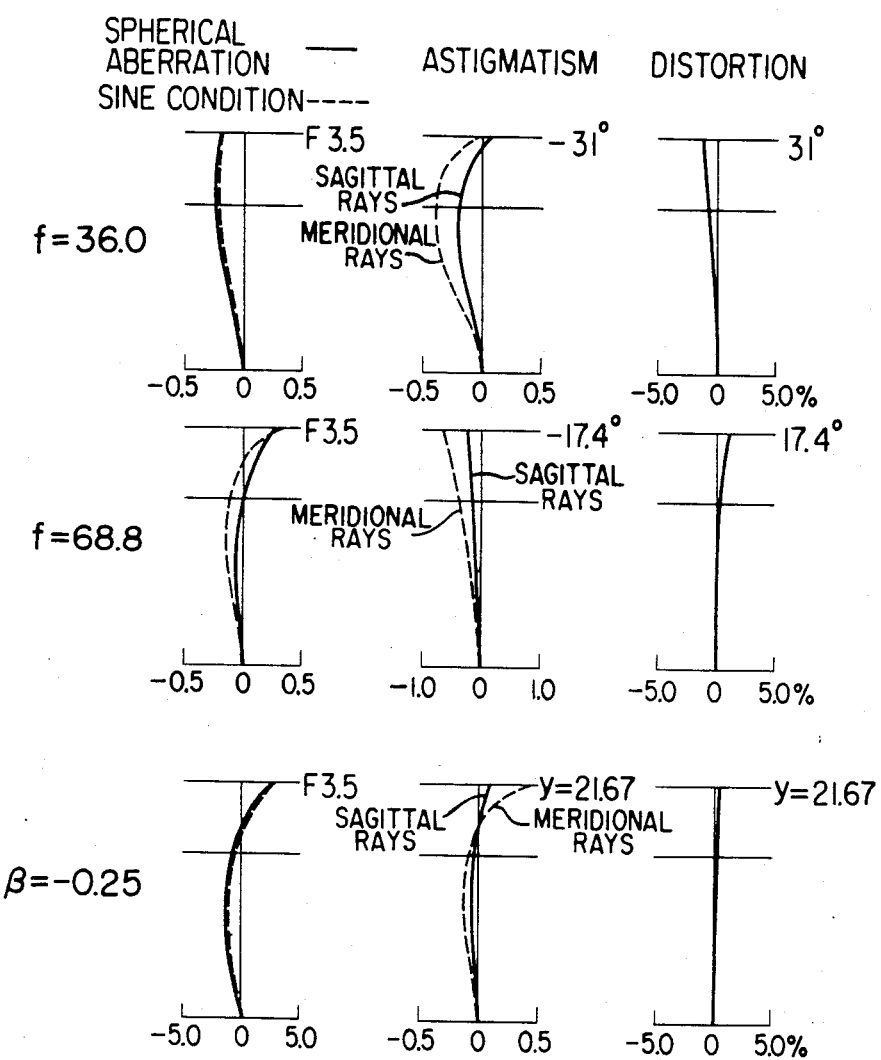

The lens arrangements of the first, second and third embodiments are shown in FIGS. 2, 3 and 4, respectively. The aberrations with a photographing magnification of $\beta = -0.25$ on the closest focal length side and the longest focal length side of the respective embodiments are shown in FIGS. 5, 6 and 7.

Figure 8A:
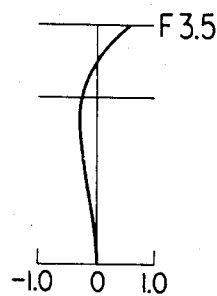
Figure 8B:
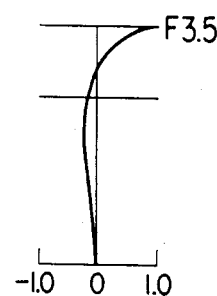
Figure 9A:
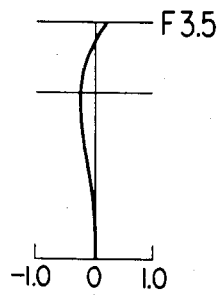
Figure 9B:
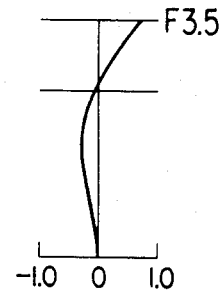
Figure 10A:
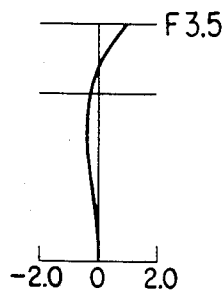
Figure 10A:
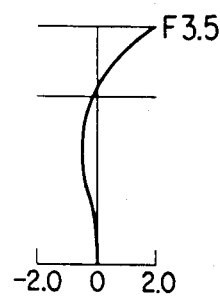

Further, the spherical aberration in a case where the close distance correction at an object distance of 1 m (photographing magnification $\beta = 0.07$) is effected on the longest focal length side of the first, second and third embodiments, respectively, (a), and in a case where such correction is not effected (b) is shown in FIGS. 8, 9 and 10.

From these aberration figures, it will be evident that in all of the embodiments the correction of the various aberrations, especially spherical aberration, at a close distance is considerably improved and an excellent image-forming performance is maintained.

It is believed that the advantages and improved results furnished by the zoom lens system of the invention will be apparent from the foregoing description of preferred embodiments of the invention. Various changes and modifications may be made without departing from the spirit and scope of the invention as sought to be defined in the following claims.

I claim:

1. A wide angle zoom lens system capable of photographing objects from infinity to a close distance while maintaining an improved image-forming performance, said system comprising:

a first divergent lens group including a divergent forward portion and a convergent rearward portion disposed with a predetermined spacing from said forward portion, the forward and rearward portions being movable relative to each other for focusing; and a second convergent lens group disposed rearwardly of said first group, said first and second groups being movable relative to each other to effect a magnification change.

2. The zoom lens system according to claim 1, satisfying the following conditions:

$$1.2|f_1| < f_{12} < 2.8|f_1|$$

and $$0.07 < d/|f_1| < 0.2,$$

where $f_1$ is the focal length of said first group, $f_{12}$ is the focal length of the rearward portion of said first group, and d is the spacing between the image side principal plane of the forward portion of said first group and the object side principal plane of the rearward portion of said first group during the focusing condition with respect to an infinite object.

3. The zoom lens system according to claim 2, wherein the rearward portion of said first group includes a positive meniscus lens having its convex surface facing the object side.

4. The zoom lens system according to claim 3, wherein the forward portion of said first group includes two negative meniscus lenses, each having its convex surface facing the object side.

5. The zoom lens system according to claim 3, wherein the forward portion of said first group includes, in order from the object side, a positive lens having its more sharply curved surface facing the object side, a negative lens having its more sharply curved surface facing the image side, and a negative meniscus lens having its convex surface facing the object side.

6. The zoom lens system according to claim 3, wherein the forward portion of said first group includes, in order from the object side, a negative meniscus lens having its convex surface facing the object side, a positive lens, and a negative lens having its more sharply curved surface facing the image side.

7. The zoom lens system according to claim 4 having the following numerical data:

Total focal length of the entire system: $f = 36.0 \sim 68.6$
Angle of view: $2\omega = 31° \sim 17.6°$ F-number: 3.5

| | | | |
|---|---|---|---|
| $r_1 = 43.640$ | $d_1 = 1.5$ | $n_1 = 1.71300$ | $\nu_1 = 53.9$ |
| $r_2 = 25.862$ | $d_2 = 4.9$ | | |
| $r_3 = 97.646$ | $d_3 = 2.3$ | $n_2 = 1.69680$ | $\nu_2 = 55.6$ |
| $r_4 = 34.089$ | $d_4 =$ close distance correcting spacing | | |
| $r_5 = 32.807$ | $d_5 = 3.8$ | $n_3 = 1.80518$ | $\nu_3 = 25.5$ |
| $r_6 = 43.313$ | $d_6 =$ variable spacing | | |
| $r_7 = 38.800$ | $d_7 = 8.6$ | $n_4 = 1.62041$ | $\nu_4 = 60.3$ |
| $r_8 = -118.771$ | $d_8 = 2.5$ | | |
| $r_9 = 21.150$ | $d_9 = 4.9$ | $n_5 = 1.62041$ | $\nu_5 = 60.3$ |
| $r_{10} = 67.565$ | $d_{10} = 2.7$ | | |
| $r_{11} = -111.186$ | $d_{11} = 4.2$ | $n_6 = 1.80518$ | $\nu_6 = 25.5$ |
| $r_{12} = 20.265$ | $d_{12} = 3.0$ | | |
| $r_{13} = -100.634$ | $d_{13} = 3.2$ | $n_7 = 1.62588$ | $\nu_7 = 35.6$ |
| $r_{14} = -29.367$ | $d_{14} = 0.1$ | | |
| $r_{15} = 50.024$ | $d_{15} = 2.5$ | $n_8 = 1.62588$ | $\nu_8 = 35.6$ |
| $r_{16} = 110.281$ | | | |

Back focal distance: $\beta f = 42.7 \sim 65.2$
Close distance correction spacing: $d_4 = 10.7(\infty) \sim 11.3 (\beta = -0.25)$
Variable spacing: $d_6 = 32.85 \sim 0.05$ 8. The zoom lens system according to claim 5 having the following numerical data:

| Total focal length of the entire system: $f = 36.0 \sim 68.8$ | | | |
|---|---|---|---|
| Angle of view: $2\omega = 31° \sim 17.4°$ F-number: 3.5 | | | |
| $r_1 = 61.849$ | $d_1 = 8.2$ | $n_1 = 1.60323$ | $\nu_1 = 42.5$ |
| $r_2 = -1037.164$ | $d_2 = 0.7$ | | |
| $r_3 = 1000.000$ | $d_3 = 1.5$ | $n_2 = 1.67790$ | $\nu_2 = 55.5$ |
| $r_4 = 23.900$ | $d_4 = 6.8$ | | |
| $r_5 = 178.734$ | $d_5 = 1.5$ | $n_3 = 1.71300$ | $\nu_3 = 53.9$ |
| $r_6 = 42.672$ | $d_6 =$ close distance correcting spacing | | |
| $r_7 = 34.110$ | $d_7 = 3.9$ | $n_4 = 1.59507$ | $\nu_4 = 35.6$ |
| $r_8 = 81.925$ | $d_8 =$ variable spacing | | |
| $r_9 = 72.840$ | $d_9 = 3.5$ | $n_5 = 1.62041$ | $\nu_5 = 60.3$ |
| $r_{10} = -72.840$ | $d_{10} = 1.0$ | $n_6 = 1.80518$ | $\nu_6 = 25.5$ |
| $r_{11} = -144.173$ | $d_{11} = 0.1$ | | |
| $r_{12} = 26.644$ | $d_{12} = 4.9$ | $n_7 = 1.51118$ | $\nu_7 = 50.9$ |
| $r_{13} = 246.000$ | $d_{13} = 0.1$ | | |
| $r_{14} = 20.743$ | $d_{14} = 4.5$ | $n_8 = 1.51680$ | $\nu_8 = 64.2$ |
| $r_{15} = 27.990$ | $d_{15} = 3.9$ | | |
| $r_{16} = -370.855$ | $d_{16} = 1.5$ | $n_9 = 1.80518$ | $\nu_9 = 25.5$ |
| $r_{17} = 18.700$ | $d_{17} = 5.2$ | | |
| $r_{18} = 64.660$ | $d_{18} = 3.8$ | $n_{10} = 1.64831$ | $\nu_{10} = 33.8$ |
| $r_{19} = -39.168$ | | | |

Back focal distance: $\beta f = 43.7 \sim 66.3$
Close distance correction spacing: $d_6 = 5.7(\infty) \sim 6.2(\beta = -0.25)$
Variable spacing: $d_8 = 33.45 \sim 0.65$ 9. The zoom lens system according to claim 6 having the following numerical data:

| Total focal length of the entire system: $f = 36.0 \sim 68.8$ | | | |
|---|---|---|---|
| Angle of view: $2\omega = 31° \sim 17.4°$ F-number: 3.5 | | | |
| $r_1 = 50.379$ | $d_1 = 1.3$ | $n_1 = 1.74443$ | $\nu_1 = 49.4$ |
| $r_2 = 27.469$ | $d_2 = 6.3$ | | |
| $r_3 = 670.373$ | $d_3 = 3.5$ | $n_2 = 1.51680$ | $\nu_2 = 64.2$ |
| $r_4 = -114.009$ | $d_4 = 0.1$ | | |
| $r_5 = \infty$ | $d_5 = 1.8$ | $n_3 = 1.71300$ | $\nu_3 = 53.9$ |
| $r_6 = 32.531$ | $d_6 =$ close distance correcting spacing | | |
| $r_7 = 35.195$ | $d_7 = 3.4$ | $n_4 = 1.76182$ | $\nu_4 = 26.5$ |
| $r_8 = 57.902$ | $d_8 =$ variable spacing | | |
| $r_9 = 101.102$ | $d_9 = 3.0$ | $n_5 = 1.51680$ | $\nu_5 = 64.2$ |
| $r_{10} = -763.611$ | $d_{10} = 0.1$ | | |
| $r_{11} = 28.387$ | $d_{11} = 6.4$ | $n_6 = 1.52000$ | $\nu_6 = 70.1$ |
| $r_{12} = -449.780$ | $d_{12} = 0.1$ | | |
| $r_{13} = 19.335$ | $d_{13} = 5.9$ | $n_7 = 1.52000$ | $\nu_7 = 70.1$ |
| $r_{14} = 37.463$ | $d_{14} = 4.0$ | | |
| $r_{15} = -564.061$ | $d_{15} = 1.4$ | $n_8 = 1.80518$ | $\nu_8 = 25.5$ |
| $r_{16} = 16.279$ | $d_{16} = 3.85$ | | |
| $r_{17} = 44.719$ | $d_{17} = 4.1$ | $n_9 = 1.67270$ | $\nu_9 = 32.2$ |
| $r_{18} = -56.453$ | | | |

Back focal distance: $\beta f = 43.8 \sim 68.7$
Close distance correction spacing: $d_6 = 8.4(\infty) \sim 9.0(\beta = -0.25)$
Variable spacing: $d_8 = 28.93 \sim 0.77$

* * * * *